United States Patent [19]

Wong

[11] 4,318,939

[45] Mar. 9, 1982

[54] STABILIZED CATALYZED ORGANOPOLYSILOXANES

[75] Inventor: Ching-Ping Wong, Lawrence Township, Mercer County, N.J.

[73] Assignee: Western Electric Co., Incorporated, New York, N.Y.

[21] Appl. No.: 180,202

[22] Filed: Aug. 21, 1980

[51] Int. Cl.³ .............................................. B05D 5/12
[52] U.S. Cl. .......................................... 427/96; 427/58; 427/387; 357/72; 528/17; 528/34; 528/901; 524/857; 524/863
[58] Field of Search .......................... 528/17, 34, 901; 260/33.4 SB; 427/387, 58, 96

[56] References Cited

U.S. PATENT DOCUMENTS

| | | | |
|---|---|---|---|
| 2,908,593 | 10/1959 | Naidus | 528/17 |
| 3,334,067 | 8/1967 | Weyenberg | 528/17 |
| 3,575,917 | 4/1971 | Kapral | 260/33.6 |
| 3,826,782 | 7/1974 | Lengnick | 260/46.5 |
| 3,847,848 | 11/1974 | Beers | 260/18 S |
| 4,100,129 | 7/1978 | Beers | 260/37 SB |
| 4,105,617 | 8/1978 | Clark et al. | 260/31.2 |
| 4,160,858 | 7/1979 | Roedel | 528/14 |

Primary Examiner—Melvyn I. Marquis
Attorney, Agent, or Firm—J. F. Spivak

[57] ABSTRACT

A method of stabilizing a mixture of an organopolysiloxane and an organo-metallic curing catalyst against gelation comprises adding a sufficient amount of methanol to the catalyst to deactivate the catalyst prior to adding the catalyst to the polysiloxane.

18 Claims, No Drawings

STABILIZED CATALYZED ORGANOPOLYSILOXANES

TECHNICAL FIELD

This invention relates to fluid, non-gelling compositions comprising dimethyl hydroxy terminated polysiloxanes and trimethylsilanes with tetramethoxy titanate curing agents. More particularly, this invention relates to stable liquid formulations containing such siloxanes, silanes and curing catalysts together with methanol which acts to inhibit the action of the curing catalyst. Such formulations are particularly useful as encapsulant materials for electronic devices such as integrated circuits.

BACKGROUND OF THE INVENTION

Solutions of organopolysiloxane fluids (silicone fluids) generally containing organic solvents together with relatively small quantities of organo-metallic curing catalysts are used as coating compositions for textiles, paper and similar cellulosic substances and are also useful as encapsulants in the electronics industry for integrated circuits and other electronic devices. Generally, the formulation is applied to the substrate material and the solvent is evaporated therefrom. Upon evaporation of the solvent the catalyst causes the silicone fluid to cure to form a thermoset, high molecular weight, relatively insoluble polymer.

As taught in U.S. Pat. No. 3,575,917, solutions of organopolysiloxanes and curing catalysts in organic solvents have been relatively unstable. The useful life of such compositions has been usually less than one day and often only a few hours and sometimes less even at room temperature. The reason for this limited life is that the curing catalyst causes the organopolysiloxane to cure or condense with itself generally forming a gel-like material or a higher molecular weight more insoluble polymer which cannot be worked or stirred. With the particular materials employed in the present invention, in the absence of a gelation inhibitor, the polymer would so polymerize, forming a gel which would relax if left overnight at room temperature. After relaxation a viscous solution remains. However, the time necessary for relaxation makes mixing and continued use of the polymer impossible until relaxation occurs.

In view of the foregoing, it would be desirable to prepare solutions of the suitable organopolysiloxanes and curing catalysts in organic solvents which can remain stable whereby gelation is inhibited until ready for use. Furthermore, if the particular formulation is to be used as an encapsulant in the electronics industry, the formulation must be devoid of materials which would attack any part of the electronic circuit being encapsulated.

SUMMARY OF THE INVENTION

A method of stabilizing a mixture of an organopolysiloxane and an organo-metallic curing catalyst against gelation comprises admixing in an amine-free environment, (a) 100 parts of a fluid dimethylpolysiloxane having the formula:

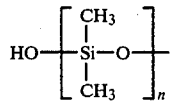

wherein n is an integer of from about 60 to about 850 and from 1 to 15 parts of a trimethoxysilane having the general formula:

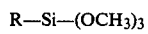

wherein R is an organic radical selected from the group consisting of a methyl radical and a vinyl radical wherein said vinyl radical has from 2 to 4 carbon atoms, together with (b) a mixture comprising 0.1 to 2 parts of a curing catalyst having the formula:

wherein R is an alkyl radical having from 2 to 8 carbon atoms and 0.05 to 10 parts methanol.

DETAILED DESCRIPTION

The particular organopolysiloxanes and silanes to which this invention pertains as well as the particular organo-metallic curing catalysts are well known in the art and are generally commercially available from a number of sources.

The organopolysiloxanes to which this invention pertains are dimethylpolysiloxanes having the general formula:

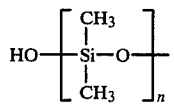

wherein n is an integer from about 60 to about 850. The preferred dimethylpolysiloxanes are liquids wherein n ranges from 400 to 850. The polysiloxane is the basic constituent of the formulation and the quantities of other constituents in the formulation are based upon 100 weight parts of the polysiloxane.

Included with the polysiloxane in the formulation is from 1 to 15 weight parts of a trimethoxysilane which is represented by the general formula:

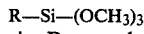

wherein R may be a methyl group or a vinyl group having from 2 to 4 carbon atoms. Trimethoxy methyl silane is the preferred constituent. The curing catalyst included in the formulation is a tetraalkoxy titanium compound having the general formula:

wherein R is an alkyl radical having from 2 to 8 carbon atoms. The catalyst is present in the amount of from 0.1 to 2 weight parts. Prior to mixing the catalyst with the other constituents the catalyst is first mixed with from 0.05 to 10 weight parts of methanol. The preferred catalysts are alkoxy groups having from 3 to 4 carbon atoms such as tetraisopropoxy titanate and tetrabutoxy or isobutoxy titanate.

When the novel formulation is to be used as an encapsulant in the electronics industry, such as to encapsulate and seal integrated circuit devices, printed wiring boards, hybrid circuits and the like, the viscosity of the material should be such that the material readily flows over and around the substrate to be encapsulated, including the ability to flow under electronic components attached to such substrate. At the same time, the composition should not be so fluid that it will not be retained on the substrate to be encapsulated. It has been found that viscosities in the range of from 9 to 13 centipoise are preferred. It has also been found that in order to achieve the preferred viscosity, the molecular weight of the hydroxy terminated dimethyl siloxanes in the formulation should be between about 32,000 to about 64,000; or stated another way n is preferably in the range of from 400 to about 850.

The useful concentration ranges of the components of the novel formulation is deemed to be highly important for obtaining a stable, room temperature curable, silicone encapsulant. More specifically, the amount of trimethoxy silane cross-linking agent in the formulation should not go below about 1 percent due to the tendency of an undesirable reaction between the silane and the hydroxy terminated dimethyl siloxane which tends to form a highly viscous or gelatin-like material. It is believed that when insufficient trimethoxy silane is present, there is then a relative excess of trimethyl siloxane which reacts with the reaction product of the trimethoxy silane and the trimethyl siloxane causing undesirable cross-linking prior to the desired curing step. Furthermore, addition of trimethoxy silane above 15 parts per 100 of the dimethyl siloxane is undesirable since excess silane is driven off from the composition during or after curing and may have toxic effects to the workers.

Similarly, depending somewhat upon the particular tetraalkoxy titanate employed, less than 0.1 parts per hundred of this curing catalyst will not result in sufficient curing at room temperature while greater than 2 percent has been found to result in an unstable cured polymer.

Furthermore, the amount of methanol employed as a curing inhibitor is also extremely important in that in order for the methanol to deactivate the catalytic action of the tetraalkoxy titanate, there must be sufficient methanol present to convert the normally tetracoordinated tetraalkoxy titanate to an octahedral structure and tie up the reaction sites of the catalyst. In order to accomplish this, the molar ratio of methanol to tetraalkoxy titanate should be in excess of at least 2 to 1. However, there must not be such an excess of methanol that the amount of methanol present separates from the silicone fluid as a separate phase due to the limited solubility of methanol in the silicones. Consequently, it has been found that, depending upon the amount of tetraalkoxy titanate catalyst present, the quantity of methanol should be between 0.05 to 10 parts per hundred of the siloxanes and preferably between about 1 to 5 parts. Furthermore, in order to prevent unwanted hydrolization of the titanate catalyst, it is preferred that the methanol be anhydrous and it is further preferred that the titanate be mixed in a solvent such as xylene to further inhibit hydrolization of the titanate due to any moisture present in the air. While the amount of xylene used in a mixture with the titanate catalyst is not critical, typically 1 to 1 volume mixtures are suitable. I have found that another important feature in the limitation of the amount of alcohol that may be present in the novel formulation is that too much alcohol (greater than 10 percent) results in the polymerization and precipitation of the titanate from the solution due to the exchange reaction between the OCH$_3$ of the methyl alcohol with the alkoxy group present on the titanate curing catalyst. Such an exchange reaction results in the presence of a tetramethoxy titanate which is unstable and tends to self-polymerize into a solid which precipitates from the reaction mixture.

It should be noted that other materials may also be added to the composition such as fillers, opacifiers, stabilizers, and ion getters. An example of fillers or opacifiers would be inorganic oxides such as titanium dioxide and the like. An example of an ion getter or trap is a class of compounds known as crown ethers and cryptates. Suitable stabilizers to be added to the composition are various metal beta-diketones such as the acetylacetonates of copper, nickel, or chromium. Typically, the stabilizers are added in a concentration range of 0.05 to 0.4 parts per 100 of the dimethyl siloxane. It has been found that if too much stabilizer is added there is too much metal present in the resulting cured resin and there is a decrease in resistivity of the encapsulant which results in an induced leakage current. Stabilizer amounts of less than 0.05, however, do not result in any significant stabilization effect. The present of the stabilizer results in an encapsulant with enhanced electrical performance, that is, an encapsulant with highest stability in a high humidity, high temperature environment and also with an encapsulant having the ability to withstand higher bias voltages before breakdown. Not only is it important to maintain the specific compositional ranges as set forth herein, it has also been found to be highly important to prevent gelation of the resin-curing catalyst mixture to first add the methanol to the curing catalyst to deactivate the catalyst prior to mixing the catalyst with the silicone material. If the methanol was mixed first with the silicone materials and the catalyst added to that mixture or if the catalyst added to the silicone materials before methanol was added at all, immediate or almost immediate gelation would occur. I have also discovered that another reason that methanol should be used as the inhibitor as opposed to any other alcohol is that use of alchols having a larger alkyl group than the alkoxy group of the titanate results in an exchange reaction with the alkxoy group of the titanate which adversely effects the curing rate and control of the polymerization reaction. Furthermore, I have discovered that one must avoid the presence of amines in the formulation as such amines are detrimental to the polymerization reaction. Furthermore, amines are corrosive to certain metals such as aluminum which is often present in electronic devices. Hence, when the formulation is employed as an encapsulant for electronic devices, the use of amines must be avoided. Therefore, the use of amino silanes taught as preferred in the prior art U.S. Pat. No. 3,575,917 must be avoided when the formula is used as an encapsulant for an electronic device. It has also be found important to limit the silane to a trimethoxy silane as opposed to a silane having any other alkoxy or other group or constituent in place of the methoxy.

Typical procedures for preparing the novel formulations are as follows:

1. The desired amount of metal beta-diketone, such as copper, nickel, or chromium, ethyl acetylacetonate, benzoacetonate or acetylacetonate is first dissolved in about 5 milliliters of xylene. This is then added to the desired amount of a stock solution containing a 1 to 1 mixture of hydroxy terminated polydimethylsiloxane in xylene. The mixture is well stirred for several minutes.

2. The trimethoxy silane is then added to the mixture of step 1 and this mixture is well stirred for several minutes.

3. A mixture of curing catalyst and alcohol is prepared and well mixed and this mixture is then added to the mixture of step 2. The resulting mixture is then well stirred for a number of minutes. No gelation occurs upon mixing the catalyst mixture with the mixture of step 2 when employing the proper amounts of materials as taught herein.

These mixtures can then be sealed and stored indefinitely prior to use as an encapsulant. The material when ready for use can be used by flow coating the material at room temperature over the substrate to be encapsulated and allowing it to stand at room temperature for from 10 to 16 hours. During this time the material is fully cured. It is material at about 120° for several hours to drive out any excess xylene which may still be present. When the mixture is coated onto the substrate, the methanol which is present as a deactivator starts to evaporate from the mixture and the catalyst becomes reactivated allowing for curing to proceed. Since evaporation of the inhibitor is necessary in order to initiate curing of the resin, the use of methanol, which has a low boiling point and hence high vapor pressure at room temperature as opposed to other alcohols, is yet an added reason for the use of methanol.

It should be noted that the tetraalkoxy titanates are commercially available from the DuPont Company. These titanates are known under the tradename Tyzor catalysts. Tyzor TPT is a tetraisopropoxy titanate, Tyzor TBT is a tetra-n-butoxy titanate, and Tyzor TOT is a tetrakis-(2-ethylhexoxy) titanate.

Comparatively speaking, the curing rate using Tyzor TPT is faster than that as compared with the Tyzor TBT or TOT. Furthermore, Tyzor TPT with methanol inhibitor can be cured in minutes as compared with Tyzor TOT with another alcohol such as 2-ethoxy hexanol which requires hours to cure with the same concentrations of materials in the formulation. The following table represents a series of formulations proposed in accordance with the invention by the procedure stated above.

Table I gives the results of various encapsulant formulations prepared in accordance with the general procedure set forth above. The hydroxy terminated dimethoxy silane employed (OH fluid) has a viscosity of 8,000 centistokes. The stabilizer noted as CEA is copper (II) ethylacetylacetone. The units refer to weight parts per hundred parts siloxane. Examples 1-8 employ Tyzor TPT catalyst while Examples 9-13 employ Tyzor TBT and Examples 14-17 employ Tyzor TOT catalyst.

TABLE I

| EXAMPLE NO. | BASE POLYMER OH FLUID (8000 c.s.) | X-LINKER (OMe)₃ SiMe | CATALYST TYZOR | INHIBITOR MeOH | SOLVENT XYLENE | STABILIZER CEA | CURE CONDITION |
|---|---|---|---|---|---|---|---|
| | | | TPT | | | | |
| (1) | 100 | 7.5 | 1.25 | 10 | 50 | 0.2 | Tacky free |
| (2) | 100 | 7.5 | 1.00 | 10 | 50 | 0.2 | Tacky free |
| (3) | 100 | 7.5 | 0.50 | 10 | 50 | 0.2 | Tacky free |
| (4) | 100 | 7.5 | 0.25 | 10 | 50 | 0.2 | Tacky |
| (5) | 100 | 15 | 1.25 | 10 | 50 | 0.2 | Tacky free |
| (6) | 100 | 15 | 1.00 | 10 | 50 | 0.2 | Tacky free |
| (7) | 100 | 15 | 0.75 | 10 | 50 | 0.2 | Tacky free |
| (8) | 100 | 15 | 0.50 | 10 | 50 | 0.2 | Slightly tacky |
| | | | TBT | | | | |
| (9) | 100 | 15 | 1.25 | 10 | 50 | 0.2 | Tacky free |
| (10) | 100 | 15 | 1.00 | 10 | 50 | 0.2 | Tacky free |
| (11) | 100 | 15 | 0.50 | 10 | 50 | 0.2 | Tacky free |
| (12) | 100 | 15 | 0.25 | 10 | 50 | 0.2 | Tacky free |
| (13) | 100 | 15 | 0.125 | 10 | 50 | 0.2 | Tacky |
| | | | TOT | | | | |
| (14) | 100 | 15 | 1.25 | 10 | 50 | 0.2 | Tacky free |
| (15) | 100 | 15 | 0.75 | 10 | 50 | 0.2 | Tacky free |
| (16) | 100 | 15 | 0.25 | 10 | 50 | 0.2 | Tacky free |
| (17) | 100 | 15 | 0.125 | 10 | 50 | 0.2 | Slightly tacky |

EXAMPLE 18

To 20 grams of 8,000 c.s. viscosity hydroxy terminated dimethylpolysiloxane in 20 microliters xylene was added 1.5 microliters of trimethoxymethylsilane and 40 mg copper # benzoylacetonate. A catalyst mixture consisting of 200 1 of Tyzor TPT in a 1 to 1 xylene solution, 0.2 microliters methanol and 5 microliters xylene was added to the first mixture and the combined admixture was further mixed without gelation. Upon curing, after flow coating, a tack-free coating was formed.

EXAMPLES 19-20

The same procedure as set forth in Example 17 was followed but employing Tyzor TBT and Tyzor TOT in place of the Tyzor TPT, respectively, with the same results.

EXAMPLES 21-23

As a comparison to the novel formulation which includes a tetraalkoxy titanium catalyst which has been deactivated by methanol, a non-deactivated catalyst was employed using the formulation set forth in examples 17-19 but without adding methanol to the titanate catalyst. Here, immediately upon addition of the catalyst to the polymer mixture, gelation occurred.

What is claimed is:

1. A method of stabilizing a mixture of an organopolysiloxane and an organo-metallic curing catalyst against gelation comprises admixing:
   (a) an amine-free mixture comprising 100 parts of a fluid dimethylpolysiloxane having the formula:

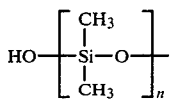

wherein n is an integer of from about 60 to about 850, and from 1 to 15 parts of a trimethoxy silane having the general formula:

RSi(OCH$_3$)$_3$ wherein R is an organic radical selected from the group consisting of a methyl radical and a vinyl radical wherein said vinyl radical has from 2 to 4 carbon atoms, together with;

(b) an amine-free mixture comprising 0.1 to 2 parts of a curing catalyst having the formula:

Ti(OR$_1$)$_4$ wherein R$_1$ is an alkyl radical having from 2 to 8 carbon atoms and 0.05 to 10 parts methanol and wherein the molar ratio of methanol to curing catalyst in the mixture is at least 2 to 1.

2. The method recited in claim 1 wherein n is from about 400 to about 850.

3. The method recited in claim 2 wherein R is a methyl radical.

4. The method recited in claim 2 wherein the curing catalyst is a titanate selected from the group consisting of tetraisoproproxy titanate, tetra-n-butoxy titanate and tetrakis-(2-ethylhexoxy) titanate.

5. The method recited in claim 4 wherein the silane is methyltrimethoxy silane and wherein the viscosity of the mixture is from 9 to 13 centipoise.

6. The method recited in claim 1 wherein the quantity of methanol present is within the solubility range of methanol in the polysiloxane.

7. The method as recited in claims 1, or 5 wherein said mixture includes a stabilizer.

8. The method recited in claim 7 wherein said stabilizer is a copper beta-diketone present in an amount of from 0.05 to 0.4 parts per 100 parts resin.

9. The method recited in claim 1 including a solvent for the polysiloxane.

10. The method recited in claim 9 wherein the solvent is xylene.

11. A polymeric amine-free mixture stabilized against gelation comprises 100 parts of a fluid dimethylpolysiloxane having the formula:

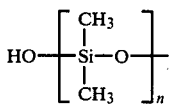

wherein n is an integer of from about 60 to about 850 and from 1 to 15 parts of a trimethoxy silane having the general formula:

RSi(OCH$_3$)$_3$ wherein R is an organic radical selected from the group consisting of a methyl radical and a vinyl radical wherein said vinyl radical has from 2 to 4 carbon atoms together with from 0.1 to 2 parts of a curing catalyst having the formula:

Ti(OR$_1$)$_4$ wherein R$_1$ is an alkyl radical having from 2 to 8 carbon atoms and wherein said curing catalyst has been deactivated by the prior addition of from 0.05 to 10 parts methanol thereto, said methanol being present in a molar ratio to the curing catalyst of at least 2 to 1, respectively.

12. The mixture recited in claim 11 wherein n is from about 400 to about 850, R is a methyl group R$_1$ is an organic selected radical from the group consisting of isopropyl, n-butyl and 2-ethylhexyl radicals.

13. The mixture recited in claim 11 including a stabilizer.

14. The mixture recited in claim 13 wherein said stabilizer is a copper beta-diketone present in a quantity of from 0.05 to 0.4 parts per 100 parts resin.

15. A method of encapsulating an electronic device comprising coating the device with a stabilized mixture, in an amine-free environment, comprising 100 parts of a fluid dimethylpolysiloxane having the formula:

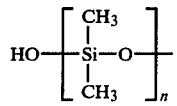

wherein n is an integer of from about 60 to about 850, from 1 to 15 parts of a trimethoxy silane having the general formula:

RSi(OCH$_3$)$_3$ wherein R is an organic radical selected from the group consisting of a methyl radical and a vinyl radical wherein said vinyl radical has from 2 to 4 carbon atoms, and from 0.1 to 2 parts of a curing catalyst having the formula:

Ti(OR$_1$)$_4$ wherein R$_1$ is an alkyl radical having from 2 to 8 carbon atoms which has been previously reacted with from 0.05 to 10 parts methanol so as to deactivate the curing catalyst, the molar ratio of methanol to curing catalyst being at least 2 to 1, evaporating the methanol from the mixture so as to reactivate the curing catalyst and thence curing the polysiloxane.

16. The method recited in claim 15 wherein n is from about 400 to about 850, R is a methyl group and R$_1$ is an organic radical selected from the group consisting of isopropyl, n-butyl and 2-ethylhexyl.

17. The method recited in claim 15 including a stabilizer in the mixture.

18. The method recited in claim 17 wherein said stabilizer is a copper beta-diketone present in an amount of from 0.05 to 0.4 parts per 100 parts resin.

* * * * *